INVENTOR.
ERWIN J. PARUSKIEWICZ
BY
WILSON, SETTLE & CRAIG
ATTORNEYS

United States Patent Office 3,166,280
Patented Jan. 19, 1965

---

3,166,280
LICENSE PLATE HOLDER
Ervin J. Paruskiewicz, 18989 Teppert, Detroit, Mich.
Filed July 31, 1961, Ser. No. 128,020
1 Claim. (Cl. 248—28)

This invention relates to a license plate holder and more particularly to a license plate holder for securing license plates to vehicles such as boats and the like.

License plate holders of many forms have been proposed heretofore. However, prior license plate holders have been complicated by the inclusion of a number of parts therein. These include retaining fasteners such as screws or the like for attaching the holder to a support surface, as well as bolts and nuts or the like of a plural number for insertion through both the license plate and the holder for retaining the license plate in position thereon. Bolts and nuts are often subject to corrosion, particularly in marine applications, and accordingly a substantial amount of effort and time are required for their removal and replacement to make a license plate exchange. It is not unusual, when two or more bolts and nuts are used to secure a license plate to a holder, to drop, misplace or lose one of the bolts or nuts during the installation. In case a plate exchange is made when a boat, for example, is in the water, dropping a bolt in the water means its loss with consequent effort of securing a replacement.

It is accordingly an important object of the present invention to provide a novel license plate holder of simplified construction.

Another object is to provide a license plate holder particularly adapted for attaching license plates to marine vehicles such as boats and the like.

A further object is to provide a license plate holder which in one embodiment requires no extraneous fasteners such as bolts and the like to secure a license plate thereto.

Other objects of this invention will appear in the following description and appended claims, reference being had to the accompanying drawings forming a part of this specification wherein like reference characters designate corresponding parts in the several views.

Figure 1:
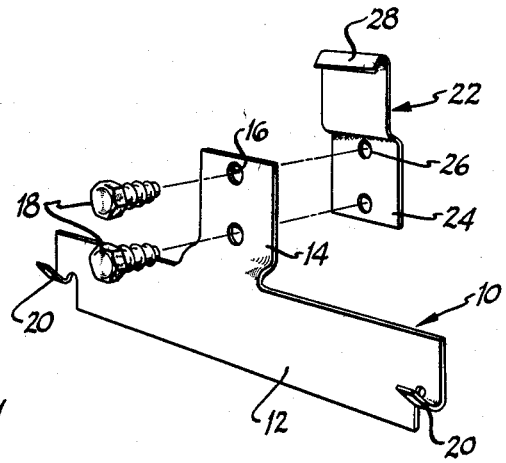
FIG. 1 is an exploded perspective view of the license plate holder of the present invention.

Briefly the present invention relates to a license plate holder which is particularly useful for securing license plates to boats. The present license plate holder is of simplified construction, utilizing only two pieces in its makeup. The two pieces include a lower bracket element of the inverted T-shaped configuration and an upper clip element forming an extension of the leg of the T-shaped bracket. The lower bracket carries a pair of tangs or ears at each extremity for entry into the lower apertures in a license plate, while the upper clip element has its upper extremity turned down in the form of a hook for overlying the central upper edge of a license plate. The holder elements are held together by rivets, bolts or screws which pass through matching holes in these elements and also serve to secure the holder to the hull of a boat, or other support surface.

THE FIRST EMBODIMENT

As more particularly shown in the drawings, the present license plate holder comprises a lower bracket 10 of inverted T-shaped configuration that is suitably stamped from sheet metal stock.

The lower clip element 10 includes a cross-arm 12 of elongated plate-like configuration and a body portion 14 extending upwardly from a median portion of the cross-arm 12. The cross arm 12 and the body portion 14 are in planar alignment but are offset from each other so that the cross arm 12 is positioned slightly outwardly of the body portion 14. Thus the heads of screws, rivets or the like, inserted through the body portion 14, will not interfere with the license plate subsequently mounted on the cross arm 12. The body portion 14 is provided with one or more aligned apertures 16 through which screws or equivalent 18 are inserted for fastening the license plate holder to the hull of a boat or other suitable support surface.

Figure 2:
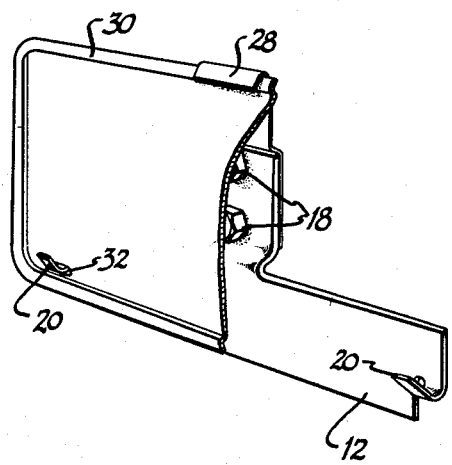
FIG. 2 is a perspective view illustrating the license plate holder of the present invention with a license plate secured thereto which is partially broken away.

At each end of the cross arm 12 there is provided an upturned tang or ear 20. These upturned tangs or ears 20 are adapted for entry into the apertures formed adjacent the lower corners of a license plate as illustrated in FIG. 2 for the retention of the license plate.

The other principal element of the license plate holder of the present invention includes an upper clip element 22 which forms an extension of the body portion 14 of the bracket 10. The upper clip element has a recessed rectangular portion 24 of a size and shape generally the same as the body portion 14 of the clip element 10 and is provided with apertures 26 alignable with the apertures 16 of the body portion 14 so that the screws 18 can be passed through both elements for securing them to a support surface.

The upper clip element 22 extends upwardly from the recessed rectangular portion 24 and the upper end is bent forwardly to provide a down-turned hook 28 for resiliently and restrainingly overlying the central upper edge of a license plate. This is illustrated in FIG. 2.

The upper clip element 22 is made of resilient sheet metal stock such as beryllium copper so that the down-turned hook 28 can be lifted and sprung over the upper edge of a license plate for retaining it in position or for quickly exchanging one license plate for another.

As shown in FIG. 2, which is an assembled view of the license plate holder of the invention, the cross arm 12 and the down-turned hook 28 of upper clip 22 extend forwardly a sufficient distance from the body portion 14 of the lower clip 10 and the recessed rectangular portion 24 of the upper clip 22 to provide a clearance space for the heads of screws 18 behind the license plate 30.

To secure a license plate to the holder of the present invention, the apertures 32 adjacent the lower corners of the license plate are fitted over the tangs or ears 20 and the plate is moved forwardly with the upper edge toward the down-turned hook 28 of the upper clip element 22. The hook 28 is then sprung upwardly and the upper edge of the license plate is snapped therebeneath after which the hook 28 is released to spring downwardly and retain the upper edge of the plate in position. To remove the plate 30, the procedure is simply reversed; that is, the down-turned hook 28 of the upper clip element 22 is lifted and the plate is pulled forwardly and removed from the tangs or ears 20.

THE SECOND EMBODIMENT

Figure 3:
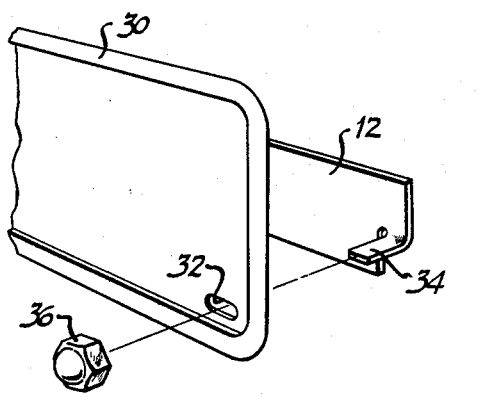
FIG. 3 is an enlarged perspective detail view of a second embodiment of the present invention.

As shown in FIG. 3, there is illustrated in fragmentary perspective view an alternate embodiment of the invention which is generally similar to the embodiment of FIGS. 1 and 2. However, instead of the up-turned tangs or ears 20 of the FIGS. 1 and 2 embodiment, outwardly extending tangs or ears 34 are utilized. These are of the same configuration as the ears 20 of the FIGS. 1 and 2 embodiment except that they extend perpendicularly from the front surface of the cross arm 12. When the lower apertures 32 of the license plate 30 are fitted over the tangs or ears 34, self-threading nuts 36 are run onto the ears 34 to secure the plate in position.

The removal and replacement of a license tag to the alternate embodiment of the invention merely involves the insertion of the upper edge of the plate under the down-turned upper extremity 28 and in positioning the holes 32 of the plate 30 upon the tangs or ears 34 followed by placement of the nuts 36. Removal is effected by removing the nuts and reversing the procedure.

MATERIALS OF CONSTRUCTION

In general it will be preferred to form the various parts of the license plate holder of the present invention of corrosion resistant materials. As one typical example, the lower bracket 10 is suitably stamped from sheet steel provided with a nickel, cadmium or zinc coating or other corrosion resistant metal. The lower bracket 10 can also be made of sheet brass or corrosive-resistant aluminum alloy. In some instances it may be possible to use synthetic resin parts such as glass fiber-reinforced polyester or the like.

The upper clip element 22 is suitably made of resilient material such as beryllium copper. This may, for example, be of a thickness in the range of about .010–0.030 inch.

While the above description relates to specific examples of materials which can be used, they are not to be considered as limiting upon the scope of the invention. For example uncoated sheet steel may be utilized if corrosion is not a problem.

ADVANTAGES OF THE INVENTION

One of the most obvious advantages of the present invention is the simplicity of construction. Thus only two basic parts are utilized to provide a license plate holder. These two parts are secured to a boat or other support surface in a simple manner by the use of conventional fasteners such as wood screws, rivets or the like. Also in a principal embodiment of the invention, the license plate holder of the present invention requires no separate attachment element for securing a license plate in restrained engagement therewith, inasmuch as the retaining elements are formed integrally with the two principal elements of the plate holder itself.

Having thus described my invention I claim:

A license plate holder comprising a rigid vertically disposed bracket plate having a horizontally extending cross arm, a pair of tangs integral with said cross arm, one tang being located at each end of said cross arm and projecting upwardly and forwardly from the cross arm, a centrally located rearwardly offset mounting tab integral at its lower end with said cross arm and projecting upwardly from said cross arm, a resilient clip member of sheet material having a lower body portion adapted to lie in face-to-face engagement with said mounting tab, detachable fastening means fixedly securing the lower portion of said clip to said tab, a forwardly offset upper body portion on said clip projecting upwardly above said tab and terminating at its upper end in a downwardly and forwardly inclined retaining hook, said upper body portion of said clip being in substantial vertical alignment with the forward surface of said cross arm, said hook and said tangs being operable to cooperatively grip and retain a license plate upon said holder.

References Cited by the Examiner
UNITED STATES PATENTS

| | | | |
|---|---|---|---|
| 1,329,206 | 1/20 | Pease | 248—300 |
| 1,387,090 | 8/21 | Wing | 248—28 |
| 2,277,755 | 3/42 | Hansen | 248—28 |
| 2,579,537 | 12/51 | Berlekamp | 40—210 |
| 2,935,281 | 5/61 | Huffman | 248—28 |

CLAUDE A. LE ROY, *Primary Examiner.*

ROBERT C. RIORDON, *Examiner.*